UNITED STATES PATENT OFFICE.

CAROLINE S. BROOKS, OF HELENA, ARKANSAS.

IMPROVEMENT IN THE METHODS OF PRODUCING LUBRICATED MOLDS IN PLASTER.

Specification forming part of Letters Patent No. 187,095, dated February 6, 1877; application filed November 6, 1876.

*To all whom it may concern:*

Be it known that I, CAROLINE S. BROOKS, of Helena, Arkansas, have invented a new and useful Improvement in Molding and Reproducing Ornamental Objects, of which the following is a specification:

The object of my invention is to model ornamental designs with facility, and to easily obtain reproductions of the models.

I have found, after repeated practical tests, that butter possesses properties which render it particularly available as a material for the formation of delicate and perfect designs. I have made designs in alto-mezzo and basso-relievo, as well as busts and other ornamental objects, of butter.

The best butter should be selected for the purpose, and it should be as free as possible from foreign matter and impurities.

In order to make a design in alto or basso relievo I first pack the butter into a shallow pan, or other appropriate vessel, and by suitable instruments (preferably of wood) I proceed to model the design. When this has been completed I place round the modeled surface an edging of any suitable material, and into the cavity thus formed I pour water mixed with plaster-of-paris, in the usual proportions required for making plaster casts.

When the casting has become solidified I heat the same, either by the application of hot water to the back or otherwise, and this heat being communicated to the butter, the casting may be withdrawn, and then further cleansed by the application of hot water.

The mold is now complete and ready for use for making reproductions of the original design, either by casting in plaster or other composition or molten metal, or by forcing a plastic substance or composition into the interstices of the mold.

In casting the mold the plaster-of-paris, where it is in contact with the butter, will absorb so much of the same that there is no necessity for lubricating the mold prior to using it for reproductions of the design.

It should be understood, however, that this absorption of a portion of the butter by the plaster does not impair the design.

The butter may be combined with lard, or lard alone, or other fatty and plastic substance which will melt when subjected to heat, may be used; but after many experiments I have found that pure butter is the best substance wherewith to carry my invention into effect.

I claim as my invention—

The method of producing lubricated plaster molds for the reproduction of original designs, the said method consisting in modeling the original pattern in butter, or equivalent greasy and plastic substance, casting the plaster upon and around the same, and then removing the said pattern by heat, substantially as specified.

In testimony whereof I have signed my name to this specification in the presence of two subscribing witnesses.

CAROLINE S. BROOKS.

Witnesses:
HERMANN MOESSNER,
HARRY SMITH.